United States Patent [19]

Sasaki et al.

[11] Patent Number: 4,496,170
[45] Date of Patent: Jan. 29, 1985

[54] SEAT BELT DEVICE FOR VEHICLES

[75] Inventors: Kiichi Sasaki; Tateo Kawade; Seiichiro Nemoto, all of Saitama, Japan

[73] Assignee: Honda Giken Kogyo Kabushiki Kaisha, Tokyo, Japan

[21] Appl. No.: 425,052

[22] Filed: Sep. 27, 1982

[30] Foreign Application Priority Data

Sep. 30, 1981 [JP] Japan .......................... 56-145194[U]

[51] Int. Cl.³ ............................................. B60R 21/10
[52] U.S. Cl. ..................................... 280/801; 297/481
[58] Field of Search ....................... 280/801, 807, 808; 297/468, 474, 481, 483

[56] References Cited

U.S. PATENT DOCUMENTS 4,231,592  11/1980  Scherenberg et al. .............. 280/808

FOREIGN PATENT DOCUMENTS 2302541  7/1974  Fed. Rep. of Germany ...... 280/801
2710754  9/1977  Fed. Rep. of Germany ...... 297/481
2396556  2/1979  France ................................ 297/481
34545    4/1981  Japan ................................. 280/801

Primary Examiner—Joseph F. Peters, Jr.
Assistant Examiner—Ross Weaver
Attorney, Agent, or Firm—Lyon & Lyon

[57] ABSTRACT

A three-way seat belt device for a vehicle has a retractor mounted on the side wall of the vehicle body. A seat belt is connected at one end thereof to the retractor and is adapted to be drawn upward from said retractor and then downward through a guide ring fixed to a pillar of the vehicle body. An anchor plate is pivotally mounted at one end on the body for swinging motion. A motor and reduction gear are provided for swinging the anchor plate. Means connect the other end of the seat belt to the swinging end of the anchor plate. A tongue member slidable on the seat belt is detachably received in a central socket on the body. Releasable means, solenoid operated, are provided to lock the anchor plate in a forward horizontal position substantially parallel to an inside surface of the vehicle body.

15 Claims, 12 Drawing Figures

SEAT BELT DEVICE FOR VEHICLES

BACKGROUND OF THE INVENTION

This invention relates to a seat belt device for vehicles and more particularly to an improved three-way seat belt for vehicles.

Since the seat belt of a three-way type seat belt device is located on one side of the rear of the seat and is located apart from the passenger seated in the seat, the passenger has to twist his body and extend his arm to put on the seat belt, an inconvenient procedure for the passenger. Particularly in a two-door vehicle, the door of which usually is large, the pillar, which retains the seat belt, is located far behind the seat; therefore, the distance between the passenger and the seat belt is increased so that seat belt fastening operation is even more inconvenient.

Various improvements have been proposed to alleviate such inconveniences. According to one exemplary improvement disclosed in Japanese Lay-Open Print No. 52-121020, a belt guide arm is raised diagonally beside the seat in conjunction with the movement of the seat to draw out the seat belt, and the belt guide arm is adapted to be laid down and housed in a horizontal position behind the door. However, this seat belt device is unattractive in respect of its appearance, since the belt guide arm is raised diagonally beside the seat and projects into the passenger space when the seat belt is fastened. In another exemplary seat belt device disclosed in Japanese Publication No. 57-24599, the seat belt is moved forward and rearward along one side of the roof in conjunction with the movement of the seat. However, this seat belt device also is not deemed to be the best in respect of the facility of a passenger in getting into and out of the vehicle. Also loading and unloading luggage from the vehicle is inconvenient, since the belt hangs down vertically in the middle part or in the front part of the door opening when the seat back is inclined toward the front. Still another seat belt device has been proposed in Japanese Lay-Open Print No. 53-56624, in which the belt is held by a seat belt holding hook provided on the shoulder of the seat back to allow the passenger to extend his arm to the shoulder of the seat back to catch the belt. However, the operation of this device is troublesome in the two-door vehicle, since the belt has to be released and engaged every time when the seat back in inclined for getting passengers into and out of the rear portion of the vehicle. This invention has been made to overcome such disadvantages of the conventional three-way seat belt devices as mentioned above and such disadvantages of the improved means of the prior art.

SUMMARY OF THE INVENTION

The present invention provides a three-way seat belt device for vehicles, having a belt which is connected at one end thereof to a retractor provided on the side wall of the body of a vehicle. The belt is adapted to be drawn upward from the retractor, then down through a guide ring, and connected at the other end thereof to a lower part of the side wall of the vehicle body. It is fastened by engaging a part thereof with a catching device provided substantially in the middle of the width of the vehicle body, wherein a comparatively long anchor member is pivotally mounted at one end thereof on the lower side sill of the vehicle frame for forward and rearward swing motion. Also, the lower end of the belt is connected to the swinging end of the anchor member, and the anchor member is arranged practically in parallel to the side surface of the side sill and practically horizontally when the anchor member is turned to its front operative position.

It is an object of the present invention to provide a seat belt device for vehicles capable of allowing the passenger to reach the seat belt easily in a natural posture merely by extending the arm, of facilitating putting on the seat belt, of eliminating the projection of the seat belt anchor holding the lower end of the seat belt thus providing good appearance, and of allowing unobstructed entrance and exit of passengers with respect to the vehicle, and loading and unloading of luggage by moving the part holding the lower end of the belt behind the doorframe by swinging the belt anchor rearward.

Other and further objects, features and advantages of the present invention will appear more fully from the following description.

DETAILED DESCRIPTION OF THE PREFERRED EMBODIMENTS

Figure 1:
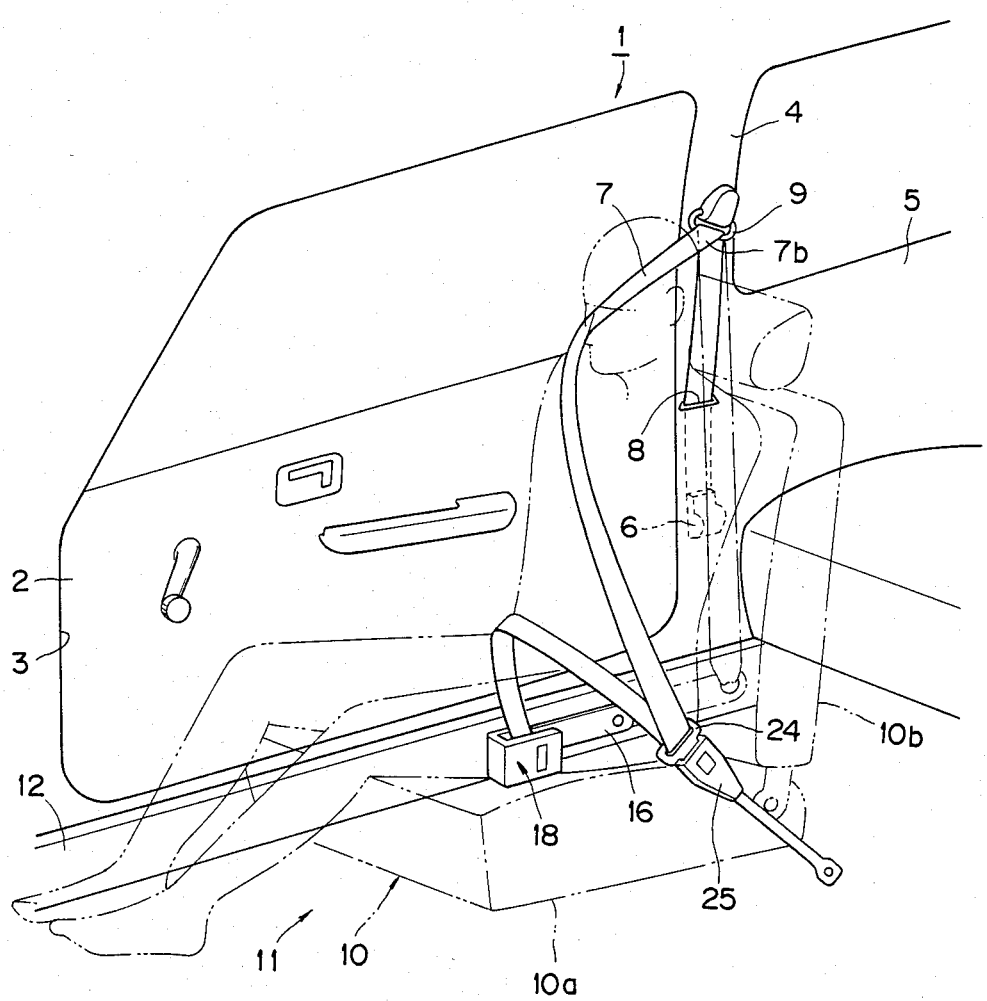
FIG. 1 is an explanatory perspective view of the first embodiment of a seat belt for vehicles in accordance with the present invention, illustrating the seat belt device as fastened and the relative position of the seat belt device within the passenger compartment.

Referring to FIG. 1, a vehicle is generally indicated at reference numeral 1. A pillar 4 is formed on the rear side of the doorframe 3 of the door 2 of the vehicle 1. The pillar 4 consists of interior and exterior plates forming integral parts of the body, not shown, and an interior lining 5. A retractor 6 is disposed within the body. A seat belt 7 connected at one end thereof to and wound on the retractor 6 is extended into the passenger compartment through an aperture 8 formed in the lining 5 and is passed downward through a guide ring 9 pivotally secured on the pillar 4.

Right and left front seats are disposed within the passenger compartment by the respective doors 2, one of which seats is illustrated by broken lines in FIG. 1. This front seat 10 comprises a seat cushion 10a which is slidable forward and rearward on the floor 11 for positional adjustment. The seat back 10b is pivoted on the rear end of the seat cushion 10a and is adapted to be laid down forward and to stand up, and to be adjustable in its rising angle.

Figure 2:
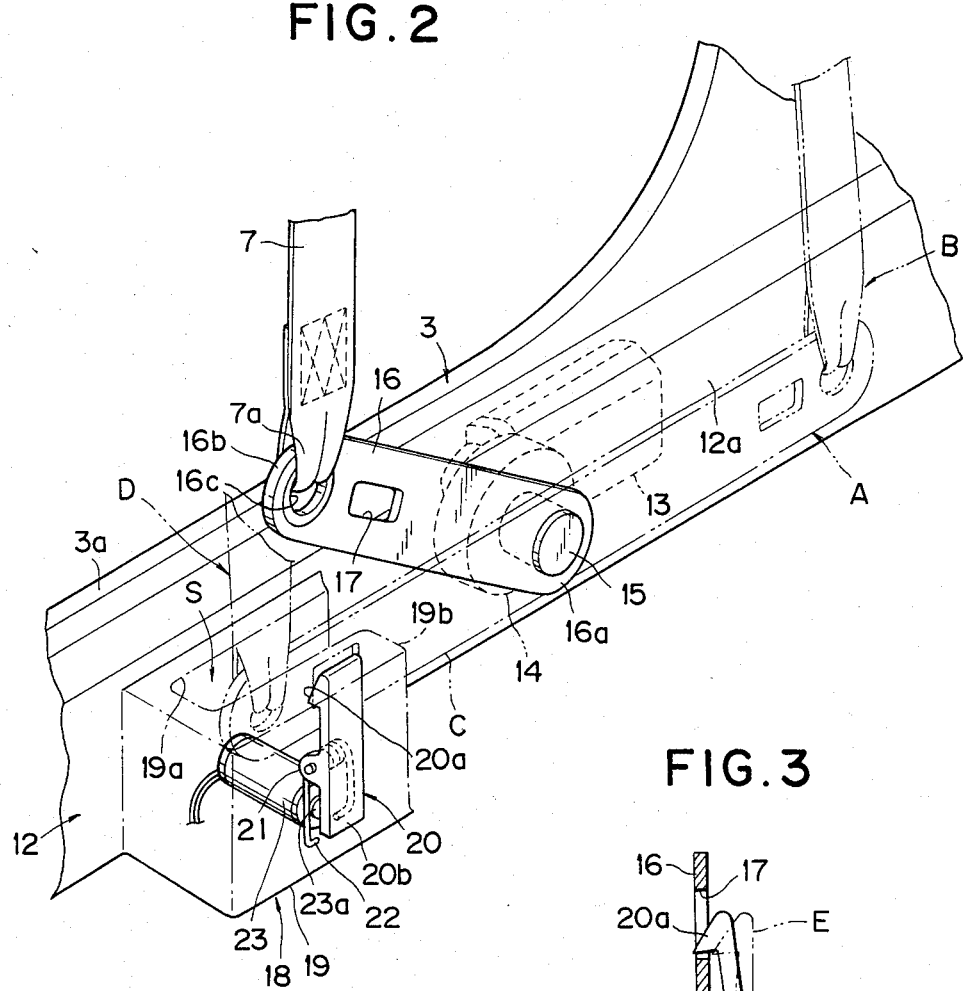
FIG. 2 is an explanatory enlarged perspective view of the anchor mechanism of the seat belt device of FIG. 1.

A driving motor 13 is provided within the lower side sill 12 of the doorframe 3 as shown in FIG. 2. The output shaft 15 of a reduction gear 14 driven by the motor 13 protrudes into the passenger compartment from the side sill 12 behind the doorframe 3 and close to the rear of the cushion seat 10a. A belt anchor plate 16 is fixed at one end 16a to the output shaft 15. The belt anchor plate 16 is of a predetermined length and is disposed practically in parallel to and at a predetermined distance from the exterior surface 12a of the side sill in the passenger compartment. A receiving hole 16c is formed at the free end 16b of the belt anchor plate 16. The lower end 7a of the seat belt 7 is attached to the receiving hole 16c. The belt anchor plate 16 is caused to swing forward and rearward through the operation of the driving motor 13 in opposite directions. The motion of the anchor plate is in a plane practically parallel to the exterior surface 12a of the side sill 12 facing the passenger compartment. When the seat belt is released, the belt anchor plate 16 is turned to the rear position where it is laid practically horizontally as shown by broken lines A in FIGS. 2 and 4. In this retracted position, the free end 16b of the belt anchor plate 16 is positioned slightly behind the rear side of the doorframe 3. Accordingly, the seat belt 7 is suspended practically vertically along the interior surface of the pillar 4, as shown by broken lines B in FIGS. 2 and 4.

A latch opening 17 is formed in the free end portion of the belt anchor plate 16 behind the receiving hole 16c. In fastening the belt 7, the belt anchor plate 16 is driven by the driving motor 13 to a front extreme position C shown in FIGS. 2 and 4 where the belt anchor plate 16 is retained practically horizontally. In this position, the folded part 7b of the seat belt 7 is held by the guide ring 9 at an upper part of the pillar 4, and the lower end 7a of the seat belt 7 connected to the free end 16b of the belt anchor plate 16 is in the front position as indicated by D in FIGS. 2 and 4.

Figure 3:
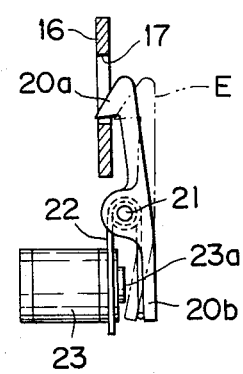
FIG. 3 is a transverse sectional view of the locking device of the anchor mechanism of FIG. 2.

A locking device 18 is provided by the exterior surface 12a of the side sill 12 at a position corresponding to the front end of the belt anchor plate 16 as laid at the front position. The locking device comprises a frame 19 practically U-shaped in plan view and having a gap S for loosely receiving the swinging end of the belt anchor plate 16 and the lower end 7a of the belt 7. The gap S is opened vertically and to the rear. The frame 19 is attached to the exterior surface 12a of the side sill 12 at one side 19a thereof. The latch opening 17 in the belt anchor plate 16 is placed within the gap S when the belt anchor plate 16 is laid at the front position. A catch 20 having a hooked upper part 20a is pivotally mounted on the inside of the other side 19b of the frame 19 by means of a pin 21. The lower part of the catch 20 below the pin 21 extends downward for a predetermined length and the catch 20 is urged by a spring 22 so that the hooked upper part 20a is caused to incline inwardly of the gap, namely, toward the side sill 12. When the belt anchor plate 16 is moved to the front position, its lower side comes into touch with the upper end of the hooked upper part 20a and causes the catch 20 to swing about the pin 21 against the resilient force of the spring 22 so that the hooked upper part 20a engages with the latch opening 17 as shown by continuous lines in FIG. 3, whereby the belt anchor plate 16 is restrained from upward movement. A solenoid 23 is disposed opposite to the inside surface of the lower part 20b of the catch 20 below the pin 21. The lower part 20b and the core 23a of the solenoid 23 are disposed opposite to each other with a space therebetween. When the solenoid 23 is energized, the catch 20 is caused to swing in a clockwise direction from the locking position shown by continuous lines in FIG. 3, whereby the engagement between the hooked upper part 20a and the latch opening 17 is released to bring the catch 20 to the unlocking position shown by broken lines E. This allows upward swinging movement of the belt anchor plate 16 about the output shaft 15.

Figure 4:
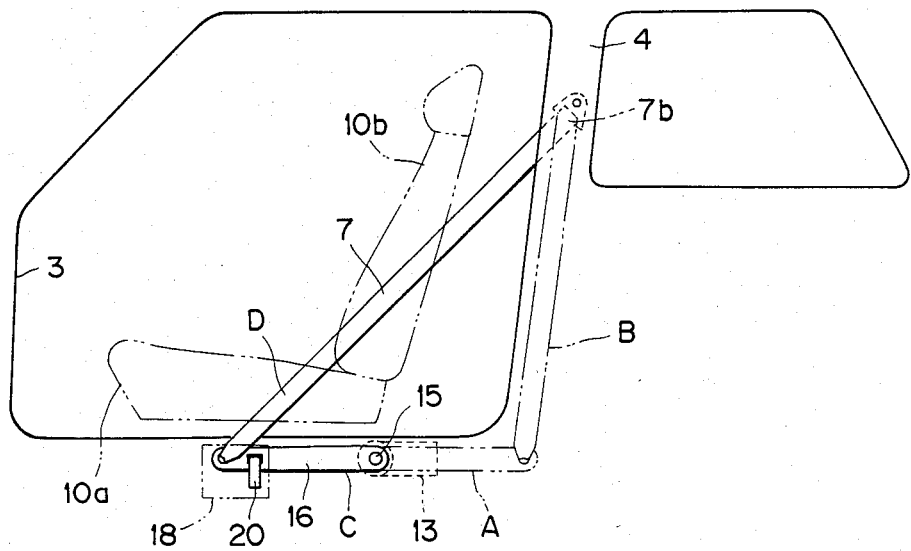
FIG. 4 is a schematic side elevation of the seat belt device of FIG. 1 for facilitating the explanation of the function of the belt anchor.
Figure 5:
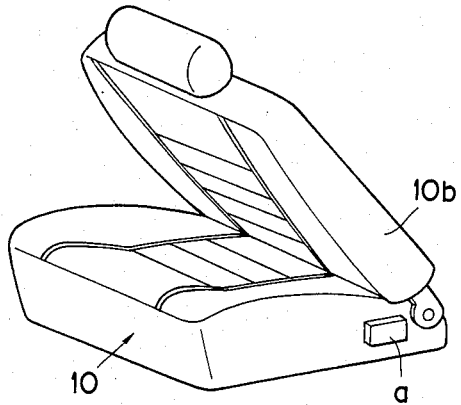
FIGS. 5 to 9 are perspective views illustrating various exemplary arrangements of the electric switches employed in the seat belt device of FIG. 1.

In the device of this invention, when a rear seat passenger intends to get in or out from the rear passenger compartment, or luggage is to be loaded or unloaded, the forward inclination of the seat back 10b is detected by means of a swing a as shown in FIG. 5, for instance. This actuates the driving motor 13 for reverse rotation to swing the belt anchor plate 16 about the axis of the shaft 15 to the rear position as shown at A in FIGS. 2 and 4 and to move the lower end 7a of the belt 7 to the rear position. The belt 7 is thus put away behind the rear side of the doorframe 3, and accordingly the entrance is cleared for the passage of passengers and luggage.

Upon detection of the state of preparedness for fastening the seat belt 7, in which a passenger is seated in the front seat 10 on the seat cushion 10a and the door 2 is closed, the driving motor 13 is automatically actuated to cause the belt anchor plate 16 to swing to the front position where it is retained at the locked position by means of the locking device 18 as shown in FIGS. 2 and 4. In this position, the belt anchor plate 16 is disposed horizontally and practically in parallel to the exterior surface 12a of the side sill 12, and not projecting upward above the lower side 3a of the doorframe 3. Since the lower end 7a of the belt 7 has been moved to the front position at the side of the seat cushion 10a, the passenger may easily reach out and take the belt 7. The belt 7 is fastened by pushing the tongue plate 24 attached to the belt 7 to engage with a catch mechanism 25 disposed in the central part of the passenger compartment, which catch mechanism is illustrated by continuous lines in FIG. 1.

Figure 6:
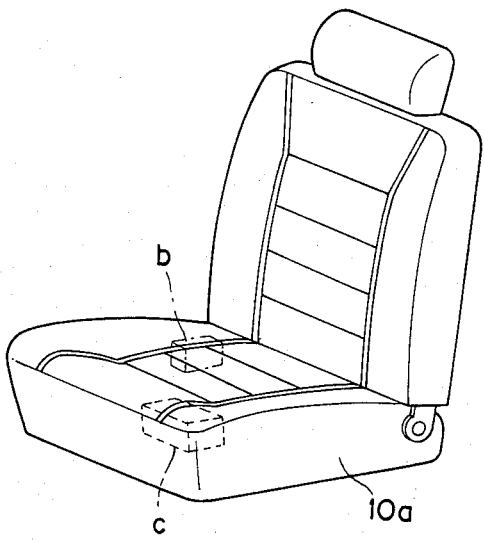
Figure 7:
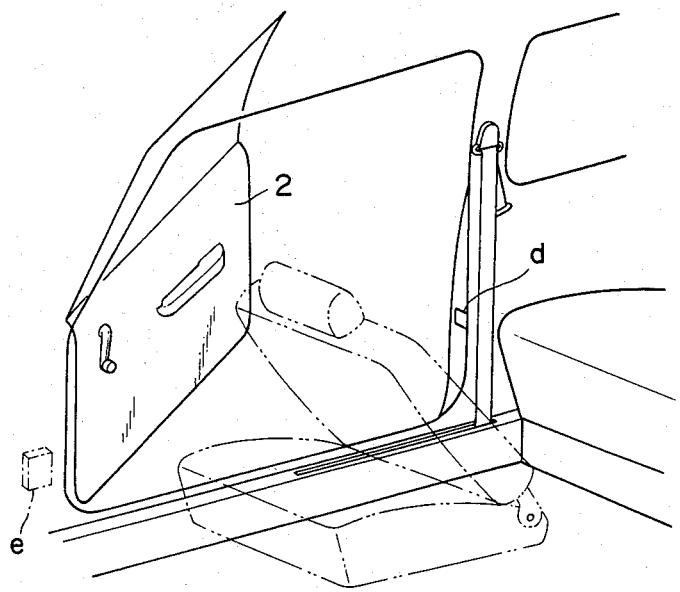
Figure 9:
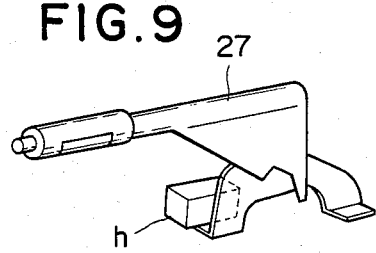

Actuation of the driving motor 13 is controlled on the basis of signals provided by pressure-sensitive switches b and c provided within the seat cushion 10a (FIG. 6), detection switches d and e for detecting the closed state of the door 2, provided on the rear side of the doorframe 3 and in the hinging part, respectively (FIG. 7), and a detection switch f for detecting the closed state of the door 2 through interference with the doorframe, provided on the door 2 (FIG. 9).

Figure 8:
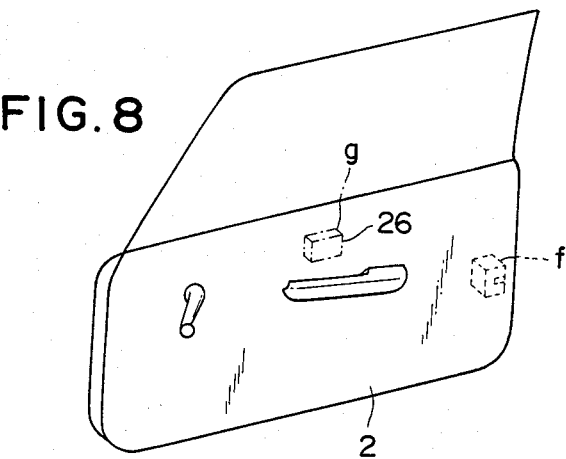

Since the belt anchor plate 16 is locked by the locking device 18, the seat belt 7 remains anchored to the body even when tensile load is applied to the seat belt 7. The cancellation of the locking state of the locking device 18 may be attained through the actuation of the solenoid 23 by the detection signal provided, for example, by a switch g for detecting the operation of the door handle 26 of the door 2 (FIG. 8) or a switch h for detecting the parking operation of the parking brake 27 (FIG. 9).

Figure 10:
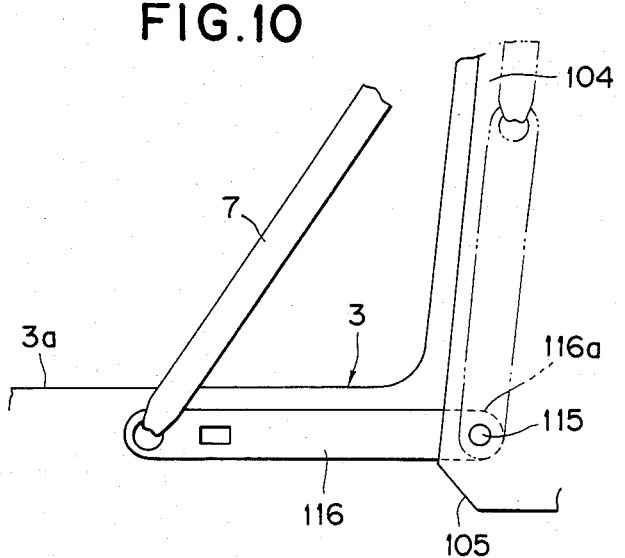
FIG. 10 is a side elevation showing the essential parts of a second embodiment of a seat belt device in accordance with the present invention.

FIG. 10 shows a second embodiment of the present invention, in which like component parts are designated by like reference numerals. A compartively long belt anchor plate 116 is attached at the rear end 116a thereof to shaft 115 to a vehicle frame behind the doorframe 3. When the belt anchor plate 116 is placed at its front operative position as shown in FIG. 5, the belt anchor plate 116 is arranged substantially horizontal below and substantially parallel to the lower side 3a of the doorframe 3. While the belt 7 is released, the belt anchor plate 116 is moved to its upright position through rotation of the shaft 115 to store the belt 7 at the rear side of the doorframe 3. According to this second embodiment, the belt anchor plate 116 is turned through 90°, instead of 180° necessary in the first embodiment to attain the same effect.

Figure 11:
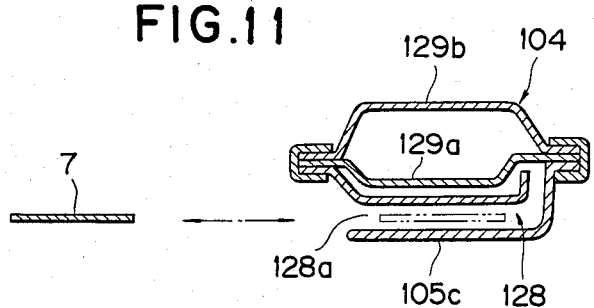
FIGS. 11 and 12 are cross sectional views of the upper part and the lower part, respectively, of the window pillar of FIG. 10.

In the second embodiment, the belt anchor plate 116 and the belt 7 are received in a gap 128 formed in the rear side of the doorframe 3 as shown in FIG. 11. When the belt 7 and the belt anchor plate 116 are retracted, that is, when the belt anchor plate 116 is turned to its standing position, the belt 7 will not be exposed in the rear passenger compartment by the rear seat. Accordingly, the belt will not come in touch with the feet of the passengers, umbrellas or the like. Therefore, the belt is kept clean and further, the belt will not obstruct the passengers getting in and out of the vehicle, and loading and unloading of luggage. In fastening the belt 7, the belt 7 is drawn out from the gap 128 and is extended to the front.

Figure 12:
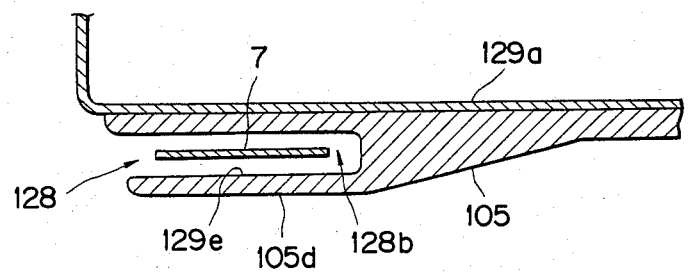

The pillar 104 arranged on the window side of the rear seat is formed by joining an interior plate 129a and an exterior plate 129b. A lining member 105c is provided on the inside surface of the interior plate 129a to form the upper part of the gap 128, which is opening toward the front and is closed at the rear. As shown in FIG. 12, the thickness of the lining member 105 is increased at the lower part of the pillar 104 to form a thick part 105d having a groove 129e of a depth greater than the width of the belt 7 opening to the front. The groove 129e forms the lower part 128b of the gap 128 for receiving the belt 7 and the belt anchor plate 116 therein.

The construction of the pillar as described above with regard to the second embodiment is applicable to the first embodiment. Although the present invention has been described as applied to a two-door vehicle 1, the present invention is applicable also to four-door vehices as well as other kinds of vehicles.

Having fully described our invention, it is to be understood that we are not to be limited to the details herein set forth but that out invention is of the full scope of the appended claims.

We claim:

1. A three-way seat belt device for a vehicle having a body provided with a pillar and a side wall, the combination of: a retractor mounted on the pillar, a seat belt connected at one end thereof to said retractor, an anchor member pivotally mounted at one end thereof on said body for swinging motion, means connecting the other end of said seat belt to the swinging end of said anchor member, a detachable catch mechanism provided substantially in the center of the width of the body, releasable means for fastening said belt by engaging a part thereof with said catch mechanism and means for locking said anchor member in a forward position substantially parallel to the side wall of said body and substantially horizontal for using the seat belt.

2. The combination set forth in claim 1 in which power means are provided for swinging said anchor member.

3. The combination set forth in claim 1 in which said detachable catch mechanism includes a tongue detachably received in central socket on the body.

4. The combination set forth in claim 1 in which said locking means includes a solenoid operated locking device for said anchor member.

5. A seat belt device according to claim 4, wherein said locking device further includes a switching mechanism which allows electric power to be supplied to said solenoid when closed.

6. A seat belt device according to claim 4, wherein switching mechanism is operated corresponding to the operating conditions of the door handle of said vehicle.

7. A seat belt device according to claim 4, wherein said switching mechanism is operated corresponding to the operating conditions of the parking brake lever of said vehicle.

8. A three-way seat belt device for a vehicle having a body provided with a pillar and a side wall, the combination of: a retractor mounted on the side wall of the vehicle body, a guide ring mounted on the pillar, a seat belt connected at one end thereof to said retractor and adapted to be drawn upward from said retractor and then downward through said guide ring, an anchor plate member pivotally mounted at one end thereof on said body for swinging motion, means connecting the other end of said seat belt to the swinging end of said anchor plate member, locking means for said anchor plate member including a latch opening formed in said anchor plate member, a catch pivotally mounted on said side wall and adapted to engage with said latch opening when said anchor plate member is at its forward horizontal position, a spring for continuously urging said catch in a direction to cause it to engage with said latch opening, and a solenoid adapted when energized to move said catch in a direction to cause it to escape from said latch opening.

9. A seat belt device according to claim 2, wherein said power means comprises a shaft member fixed to one end of said anchor member, an electric motor for driving said shaft member and a switch mechanism capable of controlling the operation of said motor.

10. A seat belt device according to claim 9, wherein said vehicle is equipped with front seats each having a tiltable seat back and said switching mechanism operates corresponding to the tilting conditions of said seat back.

11. A seat belt device according to claim 1, wherein said anchor member is rotatable through a predetermined angle from its front position and said other end of said anchor member lies over said pillar when said anchor member is rotated through said predetermined angle to the rear position.

12. A seat belt device according to claim 11, wherein said predetermined angle is approximately 180°.

13. A seat belt device according to claim 11, wherein said predetermined angle is 90°.

14. A seat belt device according to claim 1, wherein a housing space is formed in said pillar for housing said anchor member when said anchor member is rotated to its rear position.

15. A seat belt device according to claim 14, wherein a lining member is attached to the interior surface of said pillar and at least one side of said housing space is defined by said lining member.

* * * * *